United States Patent Office 2,770,368
Patented Nov. 13, 1956

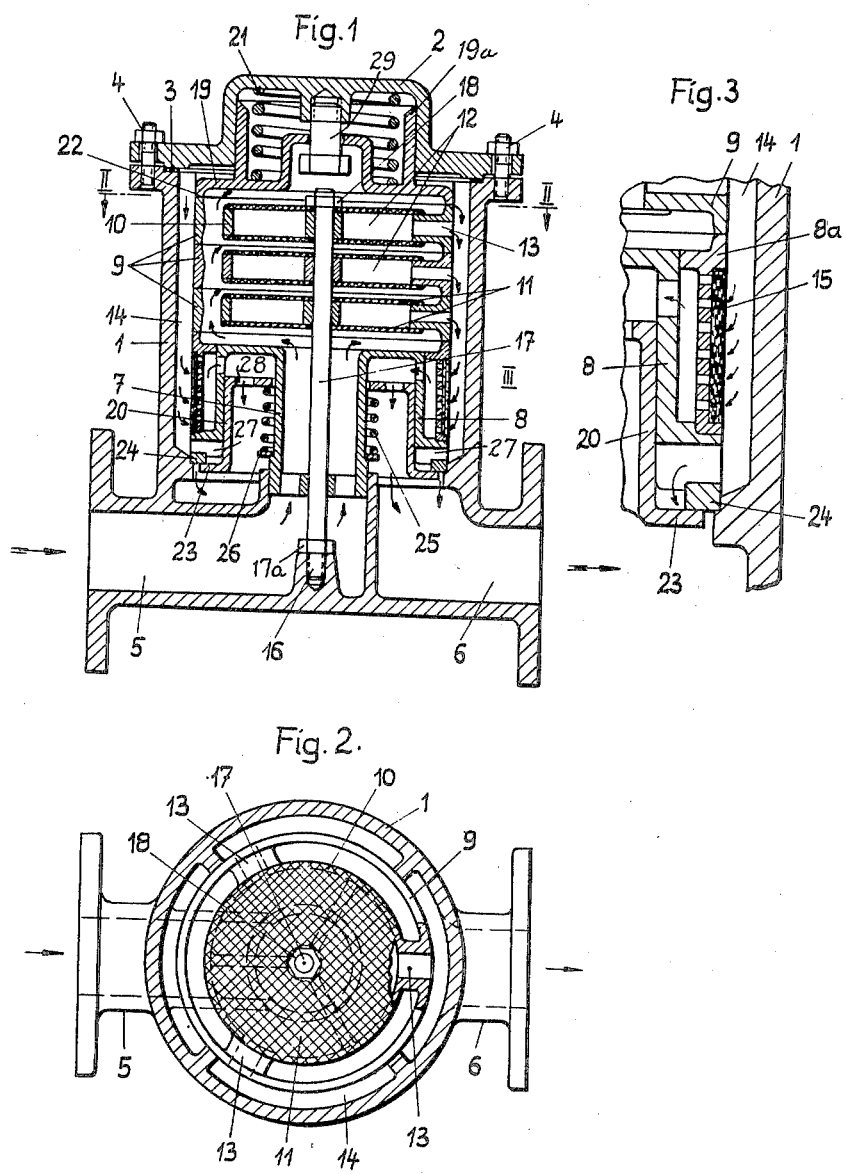

2,770,368

LIQUID FILTERS

Ernst Max Tischer, Augsburg, Germany

Application December 29, 1953, Serial No. 400,897

12 Claims. (Cl. 210—164)

This invention relates to an improvement in or modification of the liquid filter claimed in my prior specification No. 284,942, filed April 29, 1952.

The subject of the above application is a liquid filter more particularly suited for very fine filtering or a sieve coil filter consisting of a sieve band or strip arranged in a number of turns and wound on to a filter member drum under tension, the layers of which wound over one another are pressed on to one another at all points with uniform surface pressure.

A very fine filter of this type is not suited for certain purposes, particularly for filtering the circulating lubricating oil of engines as it would become choked too quickly by the solid material held back and would have to be cleaned too often. In order to allow this coil filter to be used with advantage for special purposes, particularly for filtering the circulating lubricating oil of power units (internal combustion engines, steam turbines, compressors etc.), there is arranged according to the invention in front of this sieve coil filter acting as a very fine filter a fine filter consisting of a number of circular filter elements, the coil filter and the stack of circular filter elements being arranged concentrically inside a common casing or housing.

With this new filter combination, the fine filter which has for example a width of mesh of $100\mu$ holds back solid particles greater than $100\mu$ whereupon, the very small solid particles down to about 5 can be held back by the very fine filter. When filtering circulating lubricating oil the finest solid particles are continually held back by the filter so that they do not reach the bearing points. This gives a smaller wear at these bearing points and effects a considerable saving in lubricating oil as it can be used much longer than formerly owing to the constant very fine filtering so that it only needs renewing after a long period of working. As the solid particles are held back partly by the circular filter elements and partly by the coil filter, these filters only become choked after a long period so that the new combined filter only requires cleaning at the end of a long period of operation.

One embodiment of the invention is illustrated in the accompanying drawing.

Figure 1 is a vertical section through a liquid filter for the circulating lubricating oil of power units.

Figure 2 is a cross-section through the filter on the line II—II of Figure 1.

Figure 3 represents a fragmentary detail of Figure 1 to a larger scale.

In the drawing, 1 is the filter housing and 2 its cover or closure, the latter being fixed to the housing by means of studs 4, a packing ring 3 being arranged between them. The inlet branch for the impure lubricating oil is designated as 5 and the outflow branch for the filtered oil is designated as 6. The path of the oil through the filter can be recognized from the arrows. The impure oil then passes through an axially arranged pipe 7 mounted on the drum 8 to a stack of flat filter elements. These elements each consist of an outer ring 9 and an inner ring 10 to which are secured at both sides circular sieve filters 11. The oil arriving in the direction as shown by the arrows at these surfaces filters 11 is forced through them into the inside spaces 12 of the filter elements and then flows through the passages 13 into the annular chamber 14 provided between the housing 1 and the stack of elements 9. This pre-filtered oil is then forced through the sieve coil filter 15 and then finally passes in the direction shown by the arrows through apertures 28 into the outflow branch 6. Within the meaning of the main application this coil filter consists of a comparatively narrow sieve band or strip which is wound in a number of turns and under tension on to the filter drum member 8a. In the construction shown this drum member consists of the two parts 8 and 8a rigidly connected together. In this very fine filter 15, 8 sieve band turns having a width of mesh of $50\mu$ can for example be wound over one another. This construction then gives a filtering fineness of the coil filter 15 of about $5\mu$, i. e. all solid particles greater than $5\mu$ are held back by this filter.

Four sieve band layers in the coil filter would give for example (with the same width of mesh) a filter fineness of $15\mu$.

The construction of the filter drum 8a is an important feature for obtaining this great filtering fineness. As seen in Figure 3, this filter drum is provided with a plurality of narrow ring-like bearing faces for the sieve band or strip, these faces being arranged a slight distance away from one another. This distance between the ring-shaped bearing surfaces is less than 3 mm. and the width of the ring-shaped bearing surfaces may be for instance about 1 mm.

These narrow bearing surfaces lying close together afford a good bearing for the sieve band so that the individual layers of the sieve band are pressed firmly against one another even between the bearing surfaces, a large cross-section of passage being provided for the liquid through the annular gaps.

As may be seen in the drawing, the filter elements 9, 10 and the coil filter 15 are arranged concentrically together inside the housing 1. In the advantageous form of construction shown, the stack of filter elements 9 bears directly on the filter drum 8, 8a, all the filters being stacked on a central stud 17 fixed into the filter housing at 16 and being centred and pressed together by this member. A nut 17a is mounted on the lower end of stud 17 to facilitate removal of the filter elements from housing 1 for cleaning. A nut 18 is provided on the stud 17 for this purpose. On removing the cover 2 and releasing the nut 18 all the filter elements can be drawn up out of the casing so that these elements are easily accessible for cleaning purposes.

The new combined filter is also constructed so as to be safe from excess pressure, so that when the filter elements get very dirty there will not be a shortage of oil nor will the filter sieves be destroyed. As shown in the drawing, the stack of filter elements at one end and the filter drum 8 at the opposite end are each covered with a spring, loaded excess pressure valve plate 19 and 20. The valve plate 19 guided by flange 19a slides in the cover 2 of the housing and is forced by means of a compression spring 21 on to the topmost ring 9 of the stack of filter elements at 22. Valve plate 19 is held in assembled relation to cover 2 by a bolt 29 extending through an aperture in valve plate 19. Both the valve plates 19 and 20 are constructed as step-pistons for the purpose of a partial relieving of the pressure. The valve plate 20 sliding in the drum 8 is pressed with its flange 23 from below against a ring 24 which is arranged at some distance under the filter drum 8 forming one piece with the latter and bearing against the housing 1. The valve pate 20 is under the pressure of a helical spring 25 bearing against a ring 26 fixed to the pipe 7. The space between the drum 8 and the ring 24 provides a passage 27 which will permit flow of oil in case the filter 15 becomes clogged and the pressure builds up to move valve plate 20 to open a passage between flange 23 and ring 24. The passage thus opened is of a very gerat circumferential length so the pressure will be relieved and oil will flow through a very narrow circumferential passage which, due to its narrowness, constitutes a filter.

Similarly when the filter elements 8 become clogged and the valve plate 19 is lifted the space between the valve plate and ring 9 is so narrow that it constitutes a filter. It will be noted that the piston-like flange 19a prevents cocking of plate 19 so the narrow spacing of plate 19 from ring 9 will be uniformly small.

When the circular filters 11 or the coil filter 15 is very dirty the oil pressure rises so that the excess pressure valve plates 19 or 20 are slightly raised, a very fine annular gap being formed at 22 or 24, which acts as a filter and allows the oil which cannot pass through the filters 11 or 15 to pass through.

I claim:

1. A filter for liquids comprising a housing, an inlet passage leading into the housing axially thereof, a closure for the other end of said housing, a drum-shaped filter element comprising an axial cylinder forming a passage arranged as an extension of the inlet passage, a cylindrical filter means spaced radilly outwardly by an imperforate annulus from said axial passage, an outlet coaxial of said inlet intermediate said axial passage and said cylindrical filter means, a plurality of flat filter elements each comprising an outer ring of the same diameter as the cylindrical filter element, and an inner ring, said outer ring being of greater axial length than said inner ring, said rings being interconnected by hollow spokes constituting passages for the liquid, filter material closing the ends of said inner rings, a bolt extending axially from said inlet passage through all of said filter elements to secure said elements in the housing and against said inlet, and a cover for the endmost flat filter element contacting the outer ring thereof.

2. The filter of claim 1, in which said cylindrical filter means comprises a substantially cylindrical drum means formed of a plurality of narrow ring shaped bearing means spaced from each other to form annular gaps, said bearing means having a band of non-rigid screening woven of liquid impervious filaments wound under tension to form several superimposed layers.

3. The filter of claim 1, in which an enlargement is provided on said bolt at its end adjacent the inlet passage so that upon unscrewing of the bolt from the inlet passage the entire filter assembly can be lifted from the housing.

4. The filter of claim 1, in which the closure for the housing is provided with a cylinder portion and the said cover is provided with a piston portion to engage said cylinder portion and a spring is positioned in said cylinder to press said cover into engagement with the outer ring of the endmost filter element, whereby an excess pressure on said cover will compress the spring slightly to open a relief passage forming a gap filter between said cover and said outer ring.

5. The filter of claim 1, including a radial flow passage parallel to said cylindrical filter means to bypass said cylindrical filter means, said passage being normally closed by a spring pressed annular valve which, when opened by excess pressure, forms so narrow a passage as to constitute a gap filter.

6. The filter of claim 1, in which the housing includes a flanged inlet connection and a flanged outlet connection axially aligned with each other.

7. The filter of claim 4, including a bolt extending loosely through the said cover and secured in said closure, whereby upon removal of the closure the cover is also removed while being held in assembled position with regard to said closure.

8. A liquid filter as claimed in claim 1, characterised by the feature that the plurality of filter elements at one side and cylindrical filter means at the opposite side are each covered by a spring-loaded excess-pressure valve plate, which act as gap filters.

9. A filter assembly comprising a housing, an inlet and an outlet arranged at one end of said housing, said outlet being arranged circumferentially about said inlet, a closure for the other end of said housing, a spring-pressed cover constituting a valve mounted within said closure, a very fine filter element mounted adjacent said outlet, a spring-pressed annular bypass valve means for said very fine filter, a stack of fine filter elements mounted on said very fine filter element communicating directly with said inlet, the upper edge of said stack forming the seat for said cover, and a passage from the outlet side of said stack of filters to the inlet side of said very fine filters, whereby the fluid to be filtered is first filtered by said stack of filters and subsequently by said very fine filters.

10. A liquid filter as claimed in claim 9, characterised by the feature that the stack of filter elements bears directly on said very fine filter and all the filters are stacked on a central stud fixed in the housing and are centered and pressed together by means of this stud.

11. The filter of claim 9, in which the valve formed by said cover and said stack of filters and the bypass valve are of such great circumferential extent that the movement of the valves is such a small distance that the valves when open constitute gap filters.

12. A filter means comprising a housing, an inlet conduit means extending into the housing and of substantially less cross-sectional area than the housing, said conduit including a peripheral flange, a first filtering means supported on the inlet conduit means and of less cross-sectional area than the housing and including at least one annular element, a cover plate for said element, said plate and said first filtering means having substantially the same cross-sectional area, and said first filtering means further including passage means communicating with the space between the same and the housing, a second and finer filtering means having an inlet communicating with the said space, said housing having an outlet communicating with the discharge side of the second filtering means, passage means communicating between said space and the outlet, pressure operated valve means normally closing said passage means, and means normally holding said cover plate closed whereby fluid entering said inlet flows successively through said first filtering means, said space and second filtering means and said outlet and upon clogging of said first filtering means fluid opens said cover plate to flow into said space and upon subsequent clogging of said second filtering means opens said valve means.

References Cited in the file of this patent

UNITED STATES PATENTS

| | | |
|---|---|---|
| 765,182 | King | July 19, 1904 |
| 1,714,825 | Stephan | May 28, 1929 |
| 2,098,725 | Hurn | Nov. 9, 1937 |
| 2,308,230 | Porocchia | Jan. 12, 1943 |
| 2,430,578 | Matlock | Nov. 11, 1947 |
| 2,463,137 | Bahlke | Mar. 1, 1949 |